United States Patent [19]

Kawabe

[11] Patent Number: 5,182,666
[45] Date of Patent: Jan. 26, 1993

[54] ORGANIC OPTICAL LOGIC DEVICE

[75] Inventor: Yutaka Kawabe, Sodegaura, Japan

[73] Assignee: Idemitsu Kosan Co., Ltd., Tokyo, Japan

[21] Appl. No.: 826,831

[22] Filed: Jan. 28, 1992

[30] Foreign Application Priority Data

Jan. 28, 1991 [JP] Japan .................... 3-025003

[51] Int. Cl.⁵ .................... G02F 3/00; G02F 1/35; F21V 9/00
[52] U.S. Cl. .................... 359/107; 252/582; 359/329; 385/122
[58] Field of Search ............. 359/107, 108, 328, 329; 385/122; 252/582

[56] References Cited

U.S. PATENT DOCUMENTS

| | | | |
|---|---|---|---|
| 4,431,263 | 2/1984 | Garito | 385/122 |
| 4,834,480 | 5/1989 | Baker et al. | 385/122 |
| 4,913,507 | 4/1990 | Stamnitz et al. | 385/122 |
| 4,981,613 | 1/1991 | Okazaki et al. | 385/122 |
| 5,024,499 | 6/1991 | Falk | 385/122 |
| 5,045,364 | 9/1991 | Fang | 385/122 |
| 5,079,321 | 1/1992 | Sperling et al. | 385/122 |
| 5,094,553 | 3/1992 | Yakymyshyn et al. | 385/122 |
| 5,100,584 | 3/1992 | Goto et al. | 385/122 |
| 5,106,176 | 4/1992 | Poumellec et al. | 385/122 |
| 5,112,906 | 5/1992 | Ogata et al. | 385/122 |

FOREIGN PATENT DOCUMENTS 0338445 10/1989 European Pat. Off.
2-179624 7/1990 Japan.

OTHER PUBLICATIONS

Optics Communications, vol. 76, No. 2, Apr. 15, 1990, Amsterdam NL pp. 147–150; S. Matsumoto et al: 'Third-order Nonlinear Optical Properties of Cyanine dyes and polymer Films containing these dyes'.

Optics Communications. vol. 28, No. 3, Mar. 1979, Amsterdam NL pp. 359–362; S. C. Mehendale, K. C. Rustagi: 'Optical Nonlinearities in Substituted Cyanine Dyes'.

Primary Examiner—Martin Lerner
Attorney, Agent, or Firm—Antonelli, Terry, Stout & Kraus

[57] ABSTRACT

An organic optical logic device comprising, as a nonlinear optical medium, a crystal of organic molecules which are excited to a state of electronic excitation with an oscillator strength of at least 1.0 by visible or near-infrared radiation within a region of wavelengths of 0.4 to 1.3 μm operates at room temperature with a low energy at great speed when the electronic excitation of the crystal generates excitons or exciton polaritons having a resonance wavelength of $\lambda_0$ and the organic optical logic device is operated with a driving light having a wavelength of $\lambda_o - 50$ nm to $\lambda_o + 50$ nm.

15 Claims, 6 Drawing Sheets

ORGANIC OPTICAL LOGIC DEVICE

BACKGROUND OF THE INVENTION (a) Field of the Invention

The present invention relates to organic optical logic devices, particularly to organic optical logic devices which are useful in various fields, including optical information processing, optical communication, optoelectronics and laser application fields.

(b) Description of the Related Art

The importance of nonlinear optical materials is increasing with the recent advance of optical communication optoelectronics. The development of highly efficient optical logic devices utilizing nonlinear optical effects is essential to the future applications of high-speed optical switches or optical computers, and such a development requires highly efficient nonlinear optical materials and devices utilizing them.

Heretofore, some optical logic devices have been proposed. They are produced mainly by using semiconductors, particularly GaAs or GaAlAs. These materials have strong optically nonlinear properties attributable to the real excitation of excitons, thereby forwarding the developments of practical devices and systems. The response time of the devices made of these materials, however, depends on the recombination times of excitons, so that it is impossible to shorten the response time below nanoseconds. Further, the production of such devices needs large cost and a great deal of labor because of the complicated structures thereof and the necessity for treating raw materials of high purity in ultra high vacuum circumstances. As to the problem of the response time, the response time can be improved by applying voltage to devices so that the generated excitons are separated into free carriers and are removed from the devices rapidly. Even in this case, it is difficult to reduce the response time to 100 ps or less since it is dominated by the mobility of electrons and positive holes, and other problems including a great increase of the consumption energy arise. Therefore, various kinds of devices have been made by way of trial but have not yet received practical application.

In order to overcome these problems, there have been devised optical devices that utilize polaritons of semiconductors (Japanese Patent Application Kokai Koho (Laid-open) No. 63-110414, Japanese Patent Application Kokai Koho (Laid-open) No. 63-197915). These devices utilize the nonlinear optical absorption effects of polaritons of CuCl or GaAs, and the reported response time is one ps, which is improved as compared with that of the conventional devices. These devices however have a shortcoming of exhibiting the good performance only at cryogenic temperatures around 4° K.

There have also been made researches of various kinds of organic materials. For example, in Example 2 of Japanese Patent Application Kokai Koho (Laid-open) No. 2-183229 is disclosed an organic material having a third order nonlinear optical coefficient $\gamma = 8.5 \times 10^{-28}$ (esu). An assumption of the nonlinear optical coefficient of the crystal of the organic material in consideration of the molecular concentration provides a value of $5 \times 10^{-7}$ (esu). The response time however is not reported. The value of the third order nonlinear optical coefficient is so fairly larger than those of former materials that the material is applicable for specific uses, such as electrooptic modulators, but is still insufficient for applications in general purpose optical switches or optical computer devices.

SUMMARY OF THE INVENTION

An object of the present invention is to provide organic optical logic devices which can function at great speed at room temperature with low energy.

The inventor repeated researches of solving the problems described above with the result of finding that the intended object can be satisfied by organic optical logic devices which is produced by using crystals of particular organic molecules and utilizes the optically nonlinear properties of the exciton polaritons of the crystals, and the finding led him to complete the present invention.

That is, the present invention provides an organic optical logic device comprising a nonlinear optical medium which is a crystal of organic molecules, the organic molecules being excited to a state of electronic excitation with an oscillator strength of at least 1.0 by a visible or near-infrared radiation within a region of wavelengths of 0.4 to 1.3 μm, and the organic optical logic device being driven with a driving light having a wavelength of $\lambda_o - 50$ nm to $\lambda_o + 50$ nm, when the electronic excitation of the crystal generates excitons or exciton polaritons having a resonance wavelength of $\lambda_o$.

The organic optical logic device of the present invention can function with low energy at great speed at room temperature.

DESCRIPTION OF THE PREFERRED EMBODIMENTS

Figure 1A:
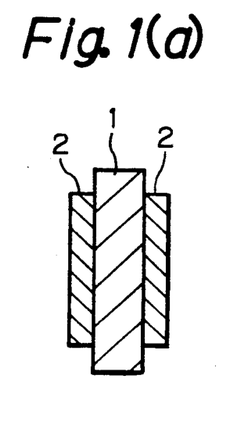
FIG. 1(a) through FIG. 1(c) are sectional views illustrating three embodiments of the organic optical logic device according to the present invention.
Figure 1B:
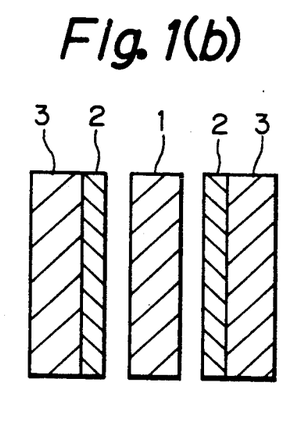
Figure 1C:
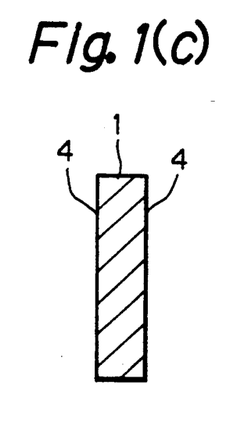

FIGS. 1(a) through 1(c) are sectional views illustrating embodiments of the organic optical logic device according to the present invention. FIG. 1(a) and FIG. 1(b) show embodiments wherein a crystal 1 of a nonlinear optical material is interposed between two mirrors 2, and FIG. 1(c) shows an embodiment wherein both sides of the crystal 1 are reflective surfaces 4. The mirrors 2, as shown in FIG. 1(a), may be one provided directly on both sides of the crystal 1 by, for example, a vacuum deposition, or, as shown in FIG. 1(b), may be ones which are supported by transparent substrates, such as glass substrates, and disposed on both sides of the crystal 1. Further, as shown in FIG. 1(c), both sides of the crystal 1 themselves may be utilized as reflective surfaces when they have high reflectivity. The mirrors or the reflective surfaces preferably have a reflectivity of 0.6 to 0.99.

The form of crystals to be used as nonlinear optical mediums is not particularly limited, and may be of single crystalline film or of polycrystalline film. The thicknesses of the crystals are preferably 0.5 to 50 μm, and are, preferably, substantially uniform. The production of such crystals may be performed suitably by employing known techniques. For example, in case of producing single crystals, when the organic molecules are capable of sublimation, a vapor phase growth technique can provide crystals of extremely high quality. In case of using organic molecules incapable of sublimation, crystals which are enough fit for optical uses can be formed from solutions or molten liquids of the organic molecules ["Crystal Engineering Handbook", Book VII, chapter 8 (Asakura Shoten, 1971)]. In case of thin films of crystals, it is known that thin films of uniform single crystals or polycrystals can be obtained from various kinds of organic materials by the molten liquid technique or the vacuum evaporation technique.

In the present invention, the crystals to be used as the nonlinear optical mediums are of organic molecules that are excited to a state of electronic excitation with an oscillator strength of at least 1.0 by visible or near-infrared radiation within a region of wavelengths of 0.4 to 1.3 μm. Although organic molecules which exhibit electronic excitation with an oscillator strength of less than 1.0 may be also used, the use thereof is disadvantageous since the effectiveness reduces in proportion to the cube of the oscillator strength. The particularly preferred organic molecules are those exhibiting an electronic excitation with an oscillator strength of 1.8 to 10.0.

The organic molecules to be used are not particularly limited so far as they have the oscillator strengths within the range described above. The preferred are those which construct the third order nonlinear optical medium, and typical examples are cyanine dyes. Typical examples are the compounds having the following structures (Japanese Patent Application Kokai Koho (Laid-open) No. 2-179624, Synthesis Example No. 2, etc.).

Of course, in addition to these compounds, many known compounds satisfy the conditions described above.

The organic optical logic device of the present invention is further characterized in that it is driven with a driving light having a wavelength of $\lambda_o-50$ nm to $\lambda_o+50$ nm, when the electronic excitation of the crystal generates excitons or exciton polaritons having a resonance wavelength of $\lambda_o$. If the wavelength of the driving light is less than $\lambda_o-50$ nm, the nonlinear optical coefficient is reduced due to the separation of the wavelength of the driving light from the resonance region, and if it is more than $\lambda_o+50$ nm, the nonlinear optical coefficient is also reduced for the same reason. Therefore, the preferred range of the wavelength of the driving light is $\lambda_o-50$ nm through $\lambda_o+50$ nm, more preferably $\lambda_o-15$ nm through $\lambda_o+15$ nm.

The theoretical background of the present invention are as follows. Provided that the following description is based on the classical theory. The behavior of electrons restrained by a Coulomb field is expressed by the model of classical damped oscillators. The following equation (1) is derived from the above:

$$\ddot{\vec{u}} + \gamma \dot{\vec{u}} + \omega_o^2 \vec{u} = F\frac{e\vec{E}}{m}. \tag{1}$$

$\vec{u}$: coordinates of electron
γ: damping factor
$\omega_0$: eigen frequency
$\vec{E}$: electric field
e: electric charge of electron
m: mass of electron
F: oscillator strength The oscillator strength F expresses the strength of the interactions between oscillators and electric fields. If the electric field of light is given by equation (2), the components of the electronic coordinates of the same frequency as the given external field are expressed by equation (3) through substituting equation (2) into equation (1).

$$\vec{E}(\vec{r}, t) = \vec{E}_0 e^{i(\vec{k}\vec{r} - \omega t)} \quad (2)$$

$\vec{r}$: position vector $\vec{k}$: wave number vector
ω: frequency $$\vec{u}(\vec{r}, t) = \frac{e\vec{E}}{m} \frac{F}{\omega_0^2 - \omega^2 - i\omega\gamma} \quad (3)$$

The macroscopic polarization of matter is given by the number of dipoles $e\vec{u}$ per unit volume with equation (4)

$$\vec{P} = n_0 e \vec{u} \quad (4)$$

$\vec{P}$: polarization
$n_o$: number of oscillators per unit volume

Then the electric flux density is expressed by equation (5)

$$\vec{D} = \vec{E} + 4\pi n_0 e \vec{u} = 1 + \frac{4\pi n_0 e^2 F/m}{\omega_0^2 - \omega^2 - i\omega\gamma} \vec{E} \quad (5)$$

$\vec{D}$: electric flux density so that the dielectric constant is given by equation (6)

$$\epsilon(\omega) = 1 + \frac{\omega_p^2 F}{\omega_0^2 - \omega^2 - i\omega\gamma} \quad (6)$$

$\epsilon(\omega)$: dielectric constant where $$\omega_p^2 = 4\pi n_0 \frac{e^2}{m}$$

$\omega_p$: plasma frequency when the background dielectric constant $\epsilon_\infty = 1$, that is the background refractive index n=1. Provided that, herein, cgs unit systems are used. If this model is applied to excitons, the relationship between the transverse exciton frequency $\omega_0$ with the longitudinal exciton frequency $\omega_L$ is obtained by solving Maxwell equation as follows:

$$\omega_L = \omega_0 \left[ 1 + \frac{F\omega_p^2}{\omega_0^2} \right]^{\frac{1}{2}} \quad (7)$$

The dispersion curve of this system is obtained by using equation (6). If the damping factor γ=0 (no relaxation) and the anisotropy is ignored for purposes of simplification, equation (8) is obtained.

$$k^2 - \frac{\omega^2}{c^2} \epsilon(\omega) = 0 \quad (8)$$

c: velocity of light in a vacuum
Solving this equation for the frequency ω provides equation (9).

$$\omega^2 = \tfrac{1}{2}(\omega_0^2 + \omega_p^2 F + c^2 k^2) \pm \tfrac{1}{2}[(\omega_0^2 + \omega_p^2 F + c^2 k^2)^2 - 4\omega_0^2 c^2 k^2]^{\frac{1}{2}} \quad (9)$$

Figure 2:
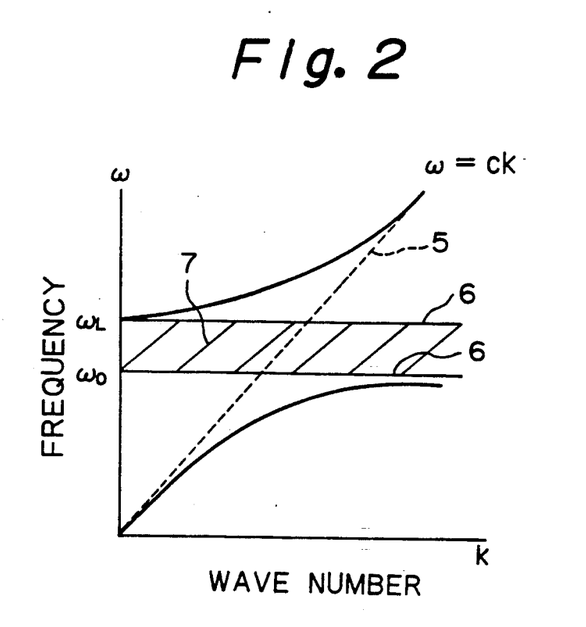
FIG. 2 is a graph showing relationship between the frequency ω and the wave number k of exciton polaritons.
Figure 3:
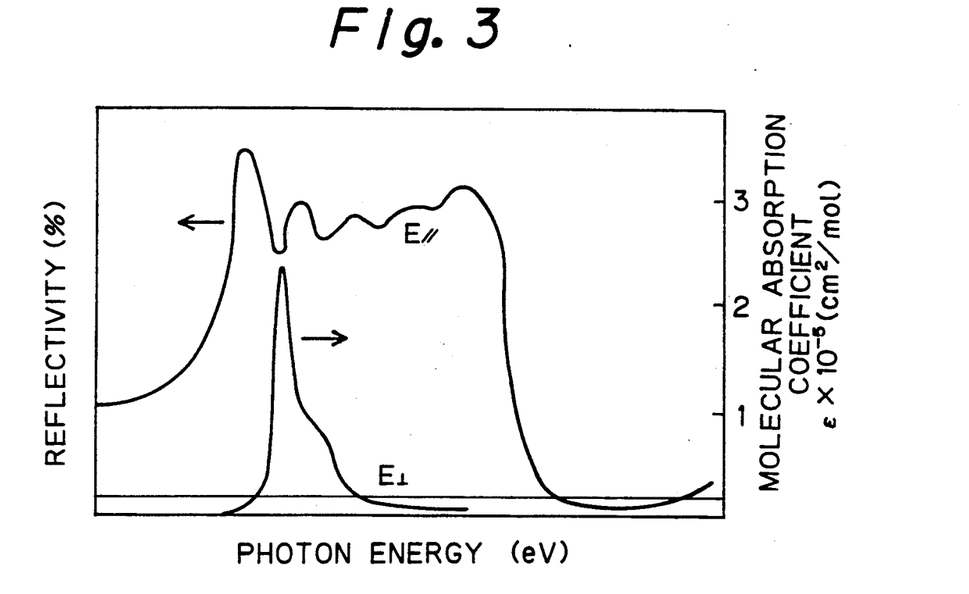
FIG. 3 is a graph showing an example of relationship between the photon energy and the reflectivity of an organic crystalline material.

The presence of the positive and negative sign shows existence of two branches of the frequencies ω for one wave number k. FIG. 2 is a graph showing the relationship between the frequency ω and the wave number k. Light does not disperse alone, and as to the dispersion of photons, the relationship between ω and k is the line ω=ck drawn in broken line in FIG. 2. Since the frequency of excitons does not depend on k near k=0, the dispersion of the excitons is expressed by the horizontal lines ω=$\omega_0$ and ω=$\omega_L$. The above holds true in the absence of the interactions between photons and excitons, but in practical observations, incident light necessarily cause interactions between photons and excitons, and they cannot exist separately. Thus, the two are mixed to form new elementary excitations, which are called exciton polaritons. The dispersion of exciton polaritons is expressed by equation (9) or the curve drawn in thick, solid line in FIG. 2. In FIG. 2, neither branches of dispersion passes between $\omega_0$ and $\omega_L$ (frequency region 7). This describes the absence of exciton polaritons in this frequency region 7, which is called "stop band". This phenomenon means total reflection of light. The presence of such stop band in some organic materials have already been reported (H. J. Hesse, W. Fuhs, G. Weiser, L. Von Szentpaly, Chem. Phys. Lett. 41 104 (1976)). FIG. 3 is a graph showing an example of the relationship between the photon energy and the reflectivity of such organic materials.

The attribution of such spectrum of reflectivity to exciton polaritons which have strong oscillator strength is proved by the correspondence between the experimental results of reflectivity and the simple classical calculations described above. That is, the reflectivity is expressed by equation (10).

$$R = \left| \frac{\epsilon^{\frac{1}{2}} - 1}{\epsilon^{\frac{1}{2}} + 1} \right|^2 \quad (10)$$

R: reflectivity

Figure 4:
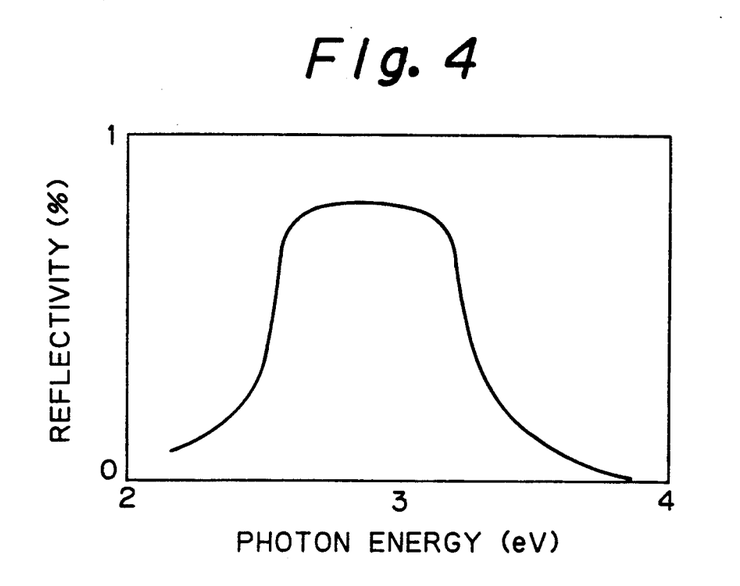
FIG. 4 is a graph showing the theoretical relationship between the photon energy and the reflectivity.

Equation (10) is also true even when ε is a complex number. With respect to the parameters in the above equation (6), $n_o$, which is the number of molecules per unit volume, is assumed to be $10^{21} cm^{-3}$. This value is appropriate for molecular crystals of a molecular weight of hundreds. The values of the electric charge e and the mass m of electrons are e=$4.8 \times 10^{-10}$ (esu) and m=$9.1 \times 10^{31}$ $^{28}$ g, respectively. This gives a plasma frequency $\omega_P$ of $1.8 \times 10^{15}$ (S$^{-1}$). As to the eigen frequency $\omega_o$ of oscillators, a value of $3.77 \times 10^{15}$ (S$^{-1}$), which corresponds to a visible radiation of 500 nm, is assumed. Further, the oscillator strength F is assumed to be a large value of 3, for example, and the damping factor γ, although it may depend upon the temperature and the crystal structure, is assumed to be 500 cm$^{-1}$, namely $9.4 \times 10^{13}$ (S$^{-1}$), for example. FIG. 4 is a graph showing the relationship between the photon energy and the reflectivity which is obtained by calculations using these parameters. FIG. 4 indicates good qualitative correspondence between the calculated values and the experimental values.

The nonlinear optical coefficients of such materials are as follows. Nonlinear polarization is caused by the nonlinear term of oscillators, which have been neglected in the above calculations. Addition of a term $\chi|u|^2 u$, which is a term proportional to the cube of u, as a nonlinear term into equation (1) gives equation (11).

$$\ddot{\vec{u}} + \gamma \dot{\vec{u}} + \omega_o^2 \vec{u} + \chi |\vec{u}|^2 \vec{u} = F\frac{e\vec{E}}{m} \qquad (11)$$

Such a nonlinear equation cannot provide analytic solutions. Then, an approximate solution is obtained assuming that the nonlinear term is much smaller than the other terms. Equation (12) is obtained from equation (11) in the same manner as that described above.

$$\vec{u} = \frac{e\vec{E}}{m} \frac{F}{\omega_o^2 - \omega^2 - i\omega\gamma + \chi|\vec{u}|^2} \qquad (12)$$

When an approximate value represented by equation (3) is substituted into u in the right side of equation (12), equation (13) is obtained.

$$\vec{u} = \frac{e\vec{E}}{m}$$

$$\frac{F}{\omega_o^2 - \omega^2 - i\omega\gamma + \chi \cdot \left|\frac{e\vec{E}}{m} F\right|^2 \times \left|\frac{1}{\omega_o^2 - \omega^2 - i\omega\gamma}\right|^2} \qquad (13)$$

Substituting equation (13) into equation (5) after expansion of equation (13) gives an electric flux density expressed by equation (14).

$$\vec{D} = \left[1 + \frac{4\pi n_o e^2 F/m}{\omega_o^2 - \omega^2 - i\omega\gamma} - \right.$$

$$\left. \frac{4\pi n_o e\chi \cdot e^3 F^3/m^3 \cdot |\vec{E}|^2}{(\omega_o^2 - \omega^2 - i\omega\gamma)^2\{(\omega_o^2 - \omega^2)^2 + \omega^2\gamma^2\}} \right] \vec{E} \qquad (14)$$

The first and second terms in [ ] are the same as those existing in equation (5) and correspond to linear polarization. The third term corresponds to the third order polarization since it is proportional to the cube of the electric field. According to a definition, the third order nonlinear optical coefficient is expressed by formula (15).

$$\chi^{(3)} = -\frac{n_o e^4 F^3 \chi}{m^3} \frac{1}{(\omega_o^2 - \omega^2 - i\omega\gamma)^2\{(\omega_o^2 - \omega^2)^2 + \omega^2\gamma^2\}} \qquad (15)$$

All parameters in formula (15) were given above, except for $\chi$ remaining undetermined. It is possible to make some estimate of the magnitude of the nonlinearity based on the existing data. For the estimate, one may consider the nonlinearity in the non-resonant wavelength range $\omega << \omega o$. If $\omega \to 0$, equation (16) is provided.

$$\chi^{(3)}_{non\text{-}res} = -\frac{n_o e^4 F^3 \chi}{m^3} \frac{1}{\omega_o^3} \qquad (16)$$

Figure 5A:
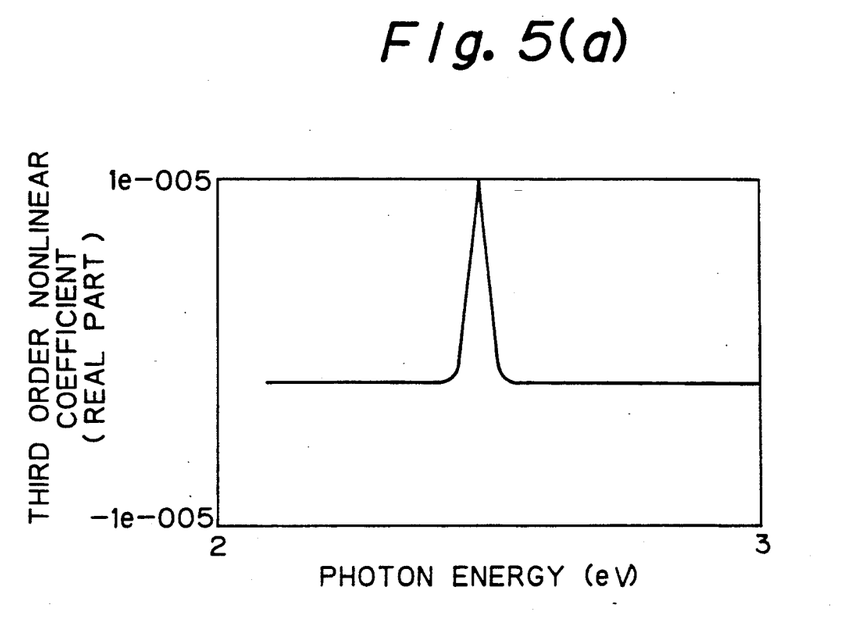
FIG. 5(a) is a graph showing the wavelength dependence of the real part of the third order nonlinear optical coefficients.
Figure 5B:
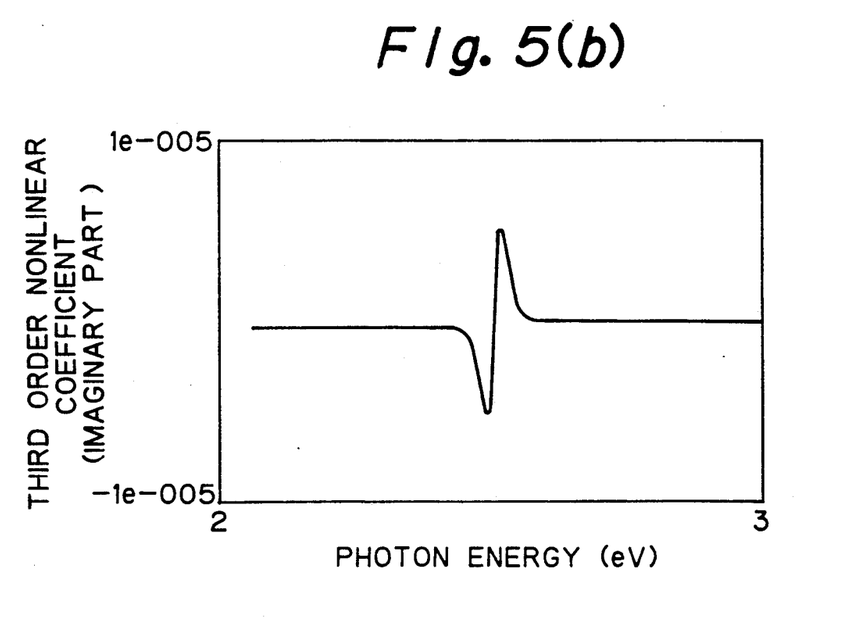
FIG. 5(b) is a graph showing the wavelength dependence of the imaginary part of the third order nonlinear optical coefficients.

It is known from the experiments of the third harmonic generation that molecular crystals having conjugated bonds, such as cyanide dyes, have a nonlinear optical coefficient of at least about $4 \times 10^{-12}$ (esu) in the non-resonant wavelength region. Accordingly, when the nonlinear optical coefficient in the non-resonant wavelength region is assumed to be $10^{-12}$, then $\chi = -8.6 \times 10^{46}$. When equation (15) is plotted as the wavelength dependence of the third order nonlinear optical coefficient, wavelength dependence of the real part and the imaginary part are obtained as shown in FIG. 5(a) and FIG. 5(b), respectively. It is shown that such an enormous value as about $10^{-5}$ is obtained at a peak. Further, in this case, the damping factor given above, which decides the response time (speed), indicates that the response time is as fast as $10^{-12}$ (s).

The organic optical logic device of the present invention can operates at great speed at room temperature with low energy owing to the use of the above-described exciton polaritons of organic crystals.

The present invention will be described in detail referring to the following Examples, which, however, does not limit the scope of the present invention.

EXAMPLES 1 TO 4 AND COMPARATIVE EXAMPLES 1 TO 4

Example 1

A crystal of nonlinear optical material is produced in the manner as described below.

5 mg of the molecules of a cyanide dye having the following structure was dissolved in 10 cc of methanol heated to 40° C. After the solution was allowed to cool by allowing it to stand at room temperature, the solvent used was evaporated at an evaporating rate of 2 cc/day, so that very small crystals were precipitated two days after.

After the small crystals were washed with methanol, a piece of the crystals (size: $30 \times 30$ $\mu m^2$, thickness: unknown) was allowed to stand in a saturated methanol solution of the same material which had been prepared by dissolving 60 mg of the same material in 100 cc of methanol and had been adjusted to an initial temperature of 38° C. When the solution was cooled at a rate of 0.5° C./day, a crystal growth proceeded from the crystal piece which had been placed in the solution as a seed, so that a plate crystal of $5 \times 200 \times 600$ $\mu m$ in sizes was obtained nine days after. The crystal had a blue metallic luster, and its high reflectivity was known from a mere visual observation.

First measurements of the optical characteristics of the obtained crystal were carried out.

Figure 6:
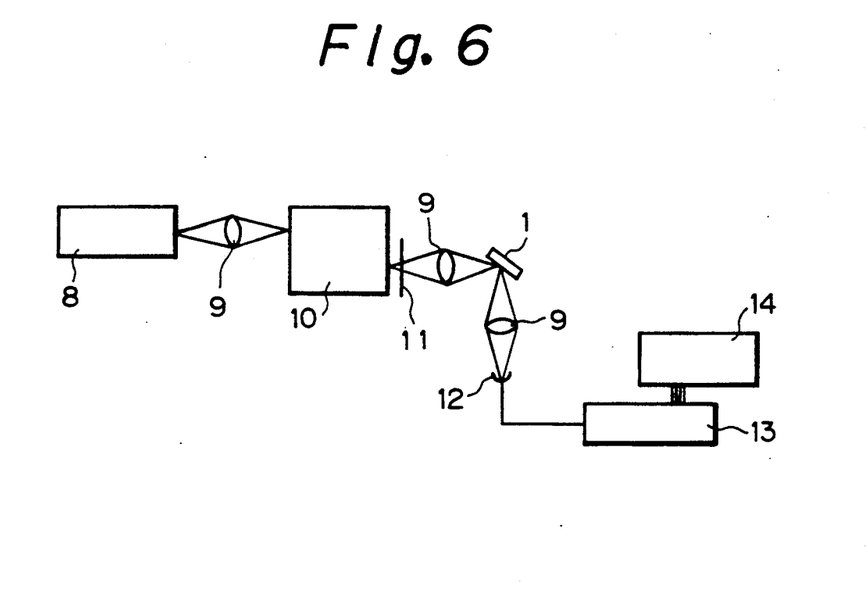
FIG. 6 is a drawing illustrating the optical system that was used in Example 2 for measuring the reflectivity of the crystal used in Example 1.
Figure 7:
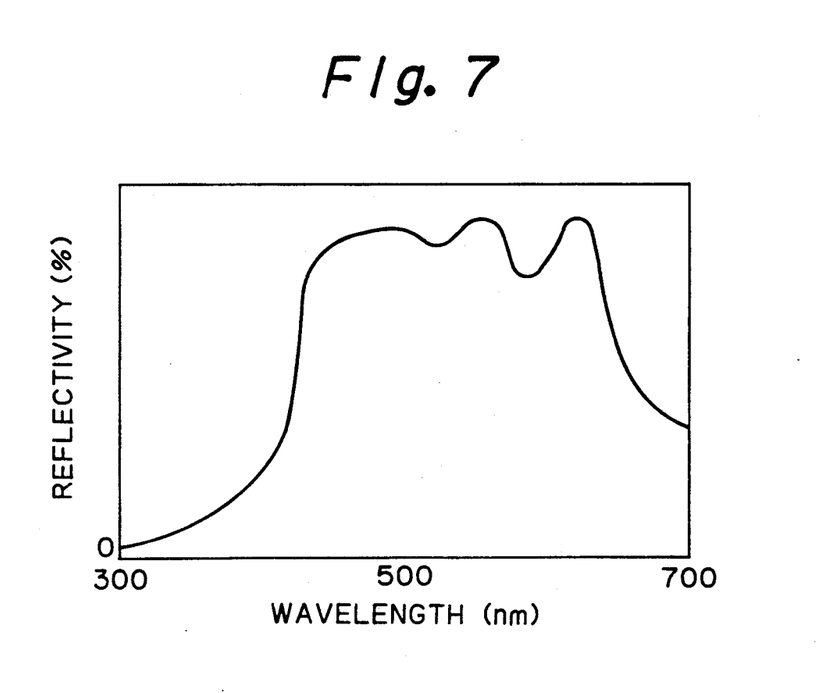
FIG. 7 is a graph showing the reflection spectrum of the crystal obtained in Example 1.

The reflectivity of the obtained crystal was measured using an optical system as shown in FIG. 6. The light emitted from a halogen lamp 8 was condensed by a lens 9, and was irradiated to the crystal 1, passing through a monochromator 10, polarizer 11 and a lens 9, and the reflected light was introduced in a photodetector 12 through a lens 9, and the intensity of the reflected light was obtained with an A-D converter 13 connected to a computer 14. At the time, the angle of the polarizer 11 was adjusted so as to maximize the reflectivity of the crystal 1. The reflectivity is maximized when the polar angle of the light coincides with the polarization direction of exciton polaritons. The reflection spectrum obtained thus is shown in FIG. 7. High reflections were obtained in the region ranging from 420 to 600 nm. The shape of the reflection spectrum indicated apparently that the crystal had a wide reflection band attributed to exciton polaritons and that an absorption peak of exciton polaritons existed around 600 nm. The difference between the measured absorption peak and the absorption peak in the solution, which was 550 nm, is attributable to the red shift of the excitation energy caused by crystallization, and this phenomenon presents generally in many kinds of organic crystals.

The oscillator strength and the damping factor are given from the thus obtained reflection spectrum as follows. The reflection spectrum may be related theoretically to the oscillator strength and the damping factor by the use of equations (6) and (10). Therefore, a comparison of the theoretical spectrum obtainable by substituting, as parameters, the oscillator strength F and the damping factor $\gamma$ into equations (6) and (10) with the the reflection spectrum obtained from the experiment enables the determination of the two parameters, F and $\gamma$.

From the procedure described above, it was known that the compound used in this Example had an oscillator strength of 1.9 and a damping factor of 500 cm$^{-1}$.

Subsequently, measurement of the nonlinear optical coefficient was carried out by the following method.

Figure 8:
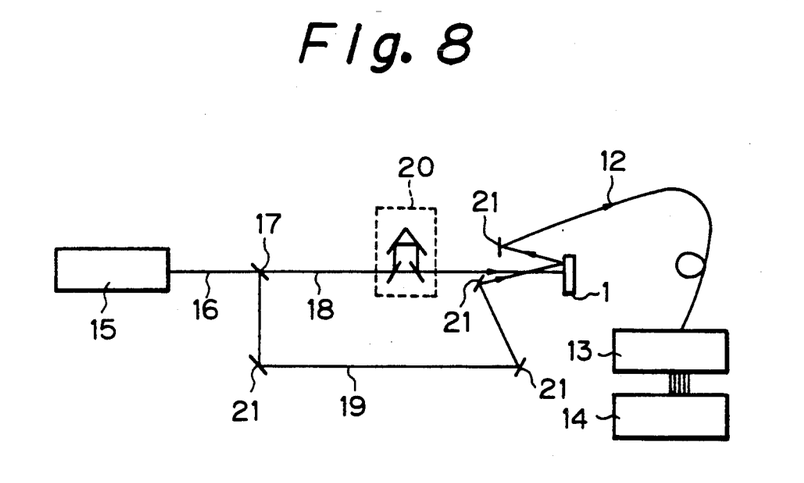
FIG. 8 is a drawing illustrating the experimental system that was used in Example 1 for measuring the nonlinear optical coefficient and high-speed response of the crystal obtained in Example 1 by a pump and probe technique.

The measurement was conducted by a method called pump and probe technique. The construction of the measuring system is shown in FIG. 8. The laser pulse 16 of 2 ps emitted from a picosecond laser 15 was divided by a beam splitter 17 into two beams with intensities of 9:1, which were then irradiated simultaneously to the crystal 1 in the same position. The stronger light is called pumping light 18, and the weaker one probing light 19. The simultaneity of the irradiations was controlled with a delay line 20. The value of the reflectivity of the probing light 19 varies depending on the presence and absence of the irradiation of the pumping light 18, and the nonlinear optical coefficient was obtained from the difference. The reference number 21 represents a mirror.

In this measurement, wavelength of 605 nm was selected for the laser beam, which was close to the peak of the exciton polariton absorption. Thus obtained was a third order nonlinear optical coefficient of $4 \times 10^{-6}$ (esu). The value at the absorption peak of 600 nm was $9 \times 10^{-6}$ (esu). Other values at other wavelengths were measured to be $1 \times 10^{-8}$ (esu) at 550 nm, $3 \times 10^{-7}$ (esu) at 585 nm, $3.5 \times 10^{-7}$ (esu) at 615 nm and $2 \times 10^8$ (esu).

The measurements of high speed response were carried out by using the same sample.

Figure 9:
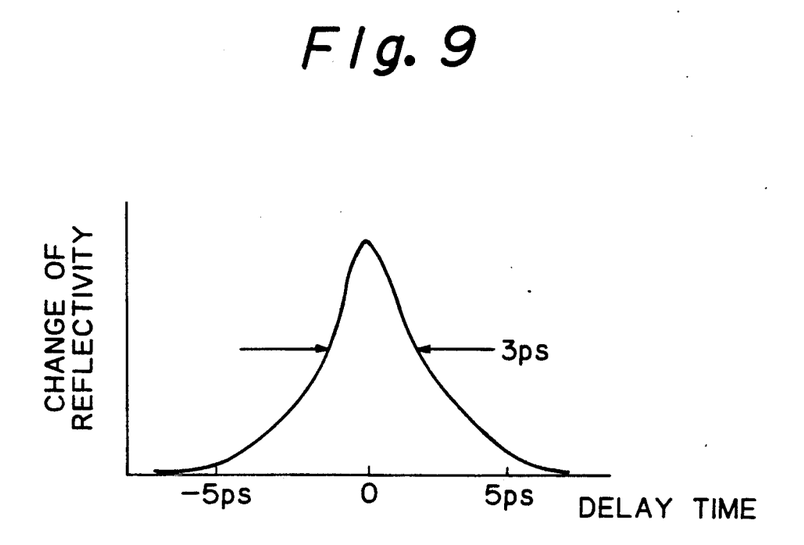
FIG. 9 is a graph showing relationship between the change of the reflectivity of the crystal obtained in Example 1 and the delay time.

The measuring apparatus used was the same as that used in the pump and probe technique. The change of the reflectivity was observed as a function of delay time of probe beam compared to the pump one, with a result as shown in FIG. 9. The half-width of the obtained result was 3 ps, which reflected the 2 ps pulse-width of the laser. This confirmed that the response time was shorter than 2 ps. Accordingly, it was known that devices produced using this material has a response time of less than 2 ps.

Next an organic optical logic device having a device length of 5 $\mu$m was constructed by sandwiching, as shown in FIG. 1(b), the above-described crystal of 5 $\mu$m thick between two mirrors which had a reflectivity of 0.8 and supported by glass substrates.

Figure 10:
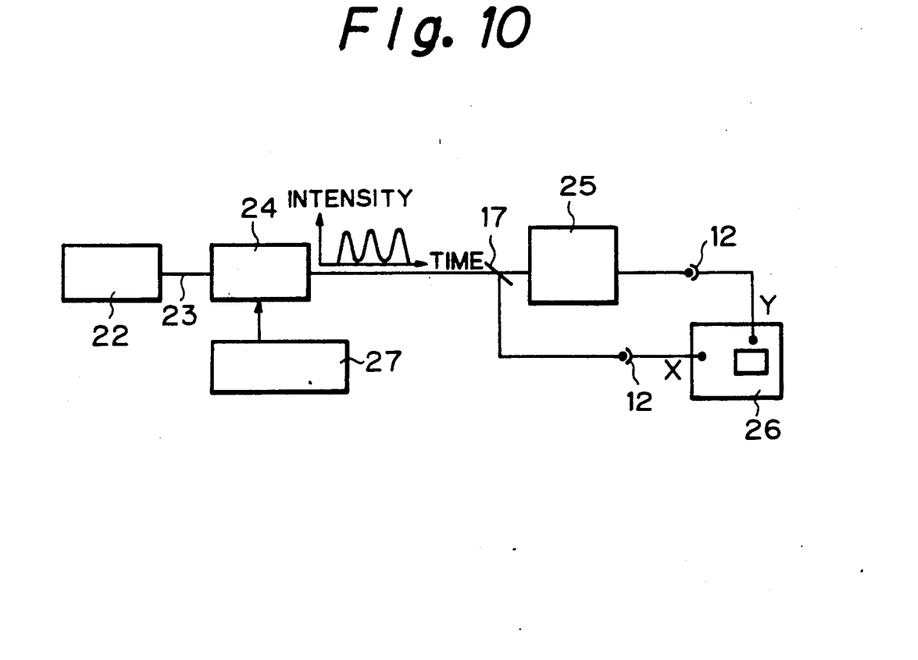
FIG. 10 is a drawing illustrating the experimental system that was used in Example 1.
Figure 11:
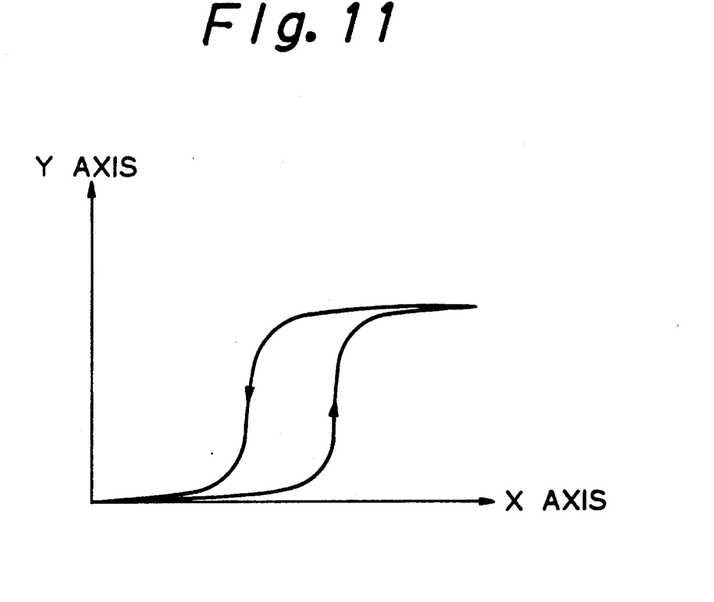
FIG. 11 is a graph showing the optical bistable operation of the organic optical logic device obtained in Example 1.

The performance of the organic optical logic device was measured by using the apparatus as shown in FIG. 10. The light 23 emitted from a CW dye laser 22 which oscillated at 605 nm was modulated at 75 MHz by an acoustooptic device 24 connected to a high-frequency power source 27, and was divided into two beams by a beam splitter 17, and one, after transmitted through the organic optical logic device 25, was received by a photodiode (photodetector 12), which output entered into the Y axis input of an oscilloscope 26, and the other entered directly into the X axis input of the oscilloscope 26 without transmitting the organic optical logic device 25. The thus obtained performance of the organic optical logic device 25 exhibited an optical bistability as shown in FIG. 11. At the time, the light power, namely the operating energy of the device was 50 mW, and the irradiated area of the organic optical logic device was approximately $15 \times 15$ $\mu$m$^2$. The operating temperature was 20° C.

The high speed response of the organic optical logic device was measured.

Although the above measurements confirms that the organic optical logic device responds at 75 MHz which corresponds to 2 ns in time field, the measurements were conducted under restricted conditions, and a response at a higher speed is expected. The response time in general depends on the propagation time of light in resonators or on the response speed of the medium used, more precisely, on the longer one of the two. In this case, the propagation time derived from the length of the device of 5 $\mu$m long is 33 fs (femtseconds) even in consideration of the effects of the refractive index. The response speed of the medium, which is given from the damping factor, can be estimated from the obtained damping factor of 500 cm$^{-1}$ to be 200 fs. This is also apparent from the data of the high speed response of the crystal described above.

The thus obtained optically bistable device is an example of optical logic devices, and other optical logic devices, such as optical inverters, optical NOR and optical AND gates, could be constructed in similar manners.

Comparative Example 1

An optical logic device was produced in the same manner as in Example 1 with the exception that a CuCl single crystal of 10 $\mu$m in size was used as a crystal of a nonlinear optical material. When the device was operated with an operating energy of 200 kW at an operating temperature of 2 K., the response time was 1 ps or less.

Example 2

An organic optical logic device was produced in the same manner as in Example 1 with the exception that a crystal of the organic molecules having the following structure was used in place of the crystal used in Example 1. The values of the nonlinear optical properties of the device around the resonance frequencies of exciton polaritons are shown in Table 1. When the high speed response and the optically bistable operation with an operating energy of 350 mW at a temperature of 20° C. were measured in the same manner as in Example 1, the device showed a good optically bistable operation and a response time of 2 ps or less.

Example 3

An organic optical logic device was produced in the same manner as in Example 1 with the exception that a crystal of the organic molecules having the following structure was used in place of the crystal used in Example 1. The values of the nonlinear optical properties of the device around the resonance frequencies of exciton polaritons are shown in Table 1. When the high speed response and the optically bistable operation with an operating energy of 40 mW at a temperature of 20° C. were measured in the same manner as in Example 1, the device showed a good optically bistable operation and a response time of 2 ps or less.

Example 4

An organic optical logic device was produced in the same manner as in Example 1 with the exception that a crystal of the organic molecules having the following structure was used in place of the crystal used in Example 1. The values of the nonlinear optical properties of the device around the resonance frequencies of exciton polaritons are shown in Table 1. When the high speed response and the optically bistable operation with an operating energy of 60 mW at a temperature of 20° C. were measured in the same manner as in Example 1, the device showed a good optically bistable operation and a response time of 2 ps or less.

TABLE 1

|  | Example 2 | Example 3 | Example 4 |
| --- | --- | --- | --- |
| Oscillator strength | 1.0 | 2.0 | 1.8 |
| Damping factor (cm$^{-1}$) | 400 | 350 | 800 |
| Wavelength $\lambda$ o at exciton polariton peak (nm) | 550 | 590 | 630 |
| Nonlinear optical coefficient at $\lambda$ o (esu) | $5 \times 10^{-5}$ | $4 \times 10^{-5}$ | $1 \times 10^{-6}$ |

Comparative Example 2

When the measurements of optical properties were carried out in the same manner as in Example using, as a nonlinear optical medium, a crystal of a kind of polydiacetylene, poly-bis(p-toluene sulphonate)-2,4-hexadiyne-1,6-diol, having the following structure, an oscillator strength of 0.35 and a damping factor of 300 cm$^{-1}$ were obtained. Further, a nonlinear optical coefficient $\chi^{(3)} = 5 \times 10^{-9}$ esu was given from the same experiment as that conducted in Example 1. The optical logic device that was produced in the same manner as in Example 1 by the use of the above material did not operate well.

Comparative Example 3

A single crystal of anthracene was prepared by a vapor phase growth technique. Measurements of the optical properties of the crystal in the same manner as in Example provided an oscillator strength of 2.3 in the absorption band existing at 250 nm and a damping factor of 400 cm$^{-1}$. Measurement of the nonlinear optical coefficient $\chi^{(3)}$ of the crystal in an wavelength region ranging from 0.4 to 1.3 $\mu$m provided a value of $1 \times 10^{-9}$ esu or less. The optical logic device that was produced in the same manner as in Example 1 by the use of the above crystal did not operate well.

Comparative Example 4

Measurement of $\chi^{(3)}$ was carried out in the same manner as in Example 1 with the exception that the optical nonlinearity of the molecules used in Example 1 was measured in a state of a solution not from the change of the reflectivity but from the change of the transmissivity. The sample was dissolved in DMSO to a concentration of 10$^{-2}$ mol/l. The macroscopic $\chi^{(3)}$ of the whole sample was $2\times10^{-10}$ esu. This indicates that the nonlinear optical coefficient of one molecule is approximately $3\times10^{-29}$ esu. Assuming that these molecules are condensed, the macroscopic nonlinear optical coefficient is estimated to be approximately $2\times10^{-8}$ esu. The value obtained in Example 1 is $9\times10^{-6}$ esu, which is larger than the estimated value by a large margin. This indicates the enhancement effects were brought about by crystallization.

What is claimed is:

1. An organic optical logic device comprising a nonlinear optical medium which is a crystal of organic molecules, the organic molecules being excited to a state of electronic excitation with an oscillator strength of at least 1.0 by a visible or near-infrared radiation within a region of wavelengths of 0.4 to 1.3 μm, and the organic optical logic device being driven with a driving light having a wavelength of $\lambda_o-50$ nm to $\lambda_o+50$ nm, when the electronic excitation of the crystal generates excitons or exciton polaritons having a resonance wavelength of $\lambda_o$.

2. The organic optical logic device as claimed in claim 1, wherein the nonlinear optical medium is a third order nonlinear optical medium.

3. The organic optical logic device as claimed in claim 2, wherein the organic molecules are excited to a state of electronic excitation with an oscillator strength of 1.8 to 10.0, and the wavelength of the driving light is in the range of $\lambda_o-15$ nm to $\lambda_o+15$ nm.

4. The organic optical logic device as claimed in claim 3, wherein the organic molecules are of a cyanine dye.

5. The organic optical logic device as claimed in claim 4, wherein the cyanine dye is selected from and -continued

6. The organic optical logic device as claimed in claim 1 further comprising two mirrors, wherein the crystal has a substantially uniform thickness of 0.5 to 50 μm and is interposed between the two mirrors.

7. The organic optical logic device as claimed in claim 6, wherein the nonlinear optical medium is a third order nonlinear optical medium.

8. The organic optical logic device as claimed in claim 7, wherein the organic molecules are excited to a state of electronic excitation with an oscillator strength of 1.8 to 10.0, and the wavelength of the driving light is in the range of $\lambda_o-15$ nm to $\lambda_o+15$ nm.

9. The organic optical logic device as claimed in claim 8, wherein the organic molecules are of a cyanine dye.

10. The organic optical logic device as claimed in claim 9, wherein the cyanine dye is selected from and

-continued and

11. The organic optical logic device as claimed in claim 1, wherein the crystal has a substantially uniform thickness of 0.5 to 50 μm, and both sides of the crystal are reflective surfaces.

12. The organic optical logic device as claimed in claim 11, wherein the nonlinear optical medium is a third order nonlinear optical medium.

13. The organic optical logic device as claimed in claim 12, wherein the organic molecules are excited to a state of electronic excitation with an oscillator strength of 1.8 to 10.0, and the wavelength of the driving light is in the range of $\lambda_o - 15$ nm to $\lambda_o + 15$ nm.

14. The organic optical logic device as claimed in claim 13, wherein the organic molecules are of a cyanine dye.

15. The organic optical logic device as claimed in claim 14, wherein the cyanine dye is selected from

* * * * *